United States Patent
Hansen

(10) Patent No.: US 11,655,880 B2
(45) Date of Patent: May 23, 2023

(54) MULTI-SPEED GEAR BOX FOR A ROTARY WING AIRCRAFT

(71) Applicant: LOCKHEED MARTIN CORPORATION, Bethesda, MD (US)

(72) Inventor: Bruce D. Hansen, Shelton, CT (US)

(73) Assignee: LOCKHEED MARTIN CORPORATION, Bethesda, MD (US)

( * ) Notice: Subject to any disclaimer, the term of this patent is extended or adjusted under 35 U.S.C. 154(b) by 372 days.

(21) Appl. No.: 16/923,445

(22) Filed: Jul. 8, 2020

(65) Prior Publication Data

US 2022/0010862 A1  Jan. 13, 2022

(51) Int. Cl.
*F16H 3/34* (2006.01)
*B64C 27/14* (2006.01)
*B64C 27/06* (2006.01)

(52) U.S. Cl.
CPC .............. *F16H 3/34* (2013.01); *B64C 27/06* (2013.01); *B64C 27/14* (2013.01)

(58) Field of Classification Search
CPC . B64C 27/06; B64C 27/17; F16H 3/34; F16H 3/36; F16H 3/366
See application file for complete search history.

(56) References Cited

U.S. PATENT DOCUMENTS

| | | | |
|---|---|---|---|
| 724,312 A | 3/1903 | Miller | |
| 767,866 A | 8/1904 | Busche | |
| 875,321 A | 12/1907 | Carter | |
| 988,235 A * | 3/1911 | Wilhelm | F16H 3/366 74/350 |
| 5,014,565 A | 5/1991 | Stephenson | |
| 2008/0173752 A1* | 7/2008 | Palcic | B64C 27/82 244/17.11 |

FOREIGN PATENT DOCUMENTS

KR    2018045460 A  *  5/2018    ............ B62M 11/10

* cited by examiner

*Primary Examiner* — Richard A Edgar
(74) *Attorney, Agent, or Firm* — Michael Best & Friedrich LLP

(57) ABSTRACT

A gear system for a rotary wing aircraft includes a first gear including an inner gear portion having a first pitch and an outer gear portion having a second pitch that is distinct from the first pitch. A second gear includes a third pitch driven at a driving rotational speed. An actuator member is coupled to the second gear while driven at the driving rotational speed. The actuator member shifts the second gear along the first gear to engage with one of the inner gear portion and the outer gear portion to drive the first gear at a first rotational speed and engage with other one of the inner gear portion and the outer gear portion to drive the first gear at a second rotational speed. A controller is operable to control the actuator member to shift the second gear between the inner gear portion and the outer gear portion.

14 Claims, 3 Drawing Sheets

MULTI-SPEED GEAR BOX FOR A ROTARY WING AIRCRAFT

BACKGROUND

The subject matter disclosed herein generally relates to the art of rotary wing aircraft and, more particularly, to a dual speed gear box for a rotary wing aircraft.

Rotorcraft employ multi-speed gearboxes that house a gear system that supports various flight configurations. The gearbox typically includes multiple clutches that allow an operator to change rotor speed. In addition, a secondary gear train is employed to change rotor speed after engaging the clutches. The use of multiple clutch systems and gear trains increases an overall manufacturing cost, repair complexity and cost to maintain spare parts as well as an overall weight of the aircraft. Accordingly, the industry would be receptive of a multi-speed gearbox that could eliminate one or more clutch systems.

BRIEF DESCRIPTION

Disclosed is a gear system for a rotary wing aircraft includes a first gear including an inner gear portion having a first pitch and an outer gear portion having a second pitch that is distinct from the first pitch. A second gear includes a third pitch which is driven at a driving rotational speed. An actuator member is coupled to the second gear while driven at the driving rotational speed. The actuator member shifts the second gear along a radius of the first gear to selectively engage with one of the inner gear portion and the outer gear portion to drive the first gear at a first rotational speed, and to selectively engage with other one of the inner gear portion and the outer gear portion to drive the first gear at a second rotational speed other than the first rotational speed. A controller is operable to selectively control the actuator member to shift the second gear between the inner gear portion and the outer gear portion.

In addition to one or more of the features described above, or as an alternative, further embodiments include a first sensor mounted to the first gear and operably connected to the controller and a second sensor mounted to the second gear and operably connected to the controller. The controller is operable to determine a rotational position of the second gear relative to the first gear.

In addition to one or more of the features described above, or as an alternative, further embodiments include wherein the outer gear portion includes a first plurality of gear teeth, the inner gear portion includes a second plurality of gear teeth, and the second gear includes a third plurality of gear teeth, wherein the first sensor is arranged in one of the first and second pluralities of gear teeth and the second sensor is arranged in one of the third plurality of gear teeth.

In addition to one or more of the features described above, or as an alternative, further embodiments include wherein the first sensor includes a first sensor element arranged in one of the first and second pluralities of gear teeth and a second sensor element arranged in another one of the first and second pluralities of gear teeth.

In addition to one or more of the features described above, or as an alternative, further embodiments include wherein the first sensor is arranged in one of the first plurality of gear teeth and the second sensor is arranged in an adjacent one of the first plurality of gear teeth.

In addition to one or more of the features described above, or as an alternative, further embodiments include wherein the first gear includes a first surface supporting the inner gear portion and the outer gear portion and a second, opposing surface supporting another inner gear portion and another outer gear portion.

In addition to one or more of the features described above, or as an alternative, further embodiments include wherein the second gear includes a first pinion gear selectively engaged with the inner gear portion and the outer gear portion and a second pinion gear selectively engaged with the another inner gear portion and the another outer gear portion.

Also disclosed is a rotary wing aircraft having a main rotor assembly including a main rotor shaft, a rotor hub connected to the main rotor shaft, and a plurality of rotor blades connected to the rotor hub, at least one prime mover connected to the main rotor assembly, and a gear system mechanically connecting the at least one prime mover and the main rotor assembly. The gear system includes a first gear including an inner gear portion having a first pitch and an outer gear portion having a second pitch that is distinct from the first pitch. A second gear includes a third pitch which is driven at a driving rotational speed. An actuator member is coupled to the second gear while driven at the driving rotational speed. The actuator member shifts the second gear along a radius of the first gear to selectively engage with one of the inner gear portion and the outer gear portion to drive the first gear at a first rotational speed, and to selectively engage with other one of the inner gear portion and the outer gear portion to drive the first gear at a second rotational speed other than the first rotational speed. A controller is operable to selectively control the actuator member to shift the second gear between the inner gear portion and the outer gear portion.

In addition to one or more of the features described above, or as an alternative, further embodiments include wherein the gear system further includes a first sensor mounted to the first gear and operably connected to the controller and a second sensor mounted to the second gear and operably connected to the controller. The controller being operable to determine a rotational position of the second gear relative to the first gear.

In addition to one or more of the features described above, or as an alternative, further embodiments include wherein the outer gear portion includes a first plurality of gear teeth, the inner gear portion includes a second plurality of gear teeth, and the second gear includes a third plurality of gear teeth, wherein the first sensor is arranged in one of the first and second pluralities of gear teeth and the second sensor is arranged in one of the third plurality of gear teeth.

In addition to one or more of the features described above, or as an alternative, further embodiments include wherein the first sensor includes a first sensor element arranged in one of the first and second pluralities of gear teeth and a second sensor element arranged in another one of the first and second pluralities of gear teeth.

In addition to one or more of the features described above, or as an alternative, further embodiments include wherein the first sensor is arranged in one of the first plurality of gear teeth and the second sensor element is arranged in an adjacent one of the first plurality of gear teeth.

In addition to one or more of the features described above, or as an alternative, further embodiments include wherein the first gear includes a first surface supporting the inner gear portion and the outer gear portion and a second, opposing surface supporting another inner gear portion and another outer gear portion.

In addition to one or more of the features described above, or as an alternative, further embodiments include wherein the second gear includes a second surface supporting the inner gear portion and the outer gear portion and a second, opposing surface supporting another inner gear portion and another outer gear portion.

In addition to one or more of the features described above, or as an alternative, further embodiments include wherein prime mover includes a first engine operatively connected to the first gear and a second engine operatively connected to the second gear.

BRIEF DESCRIPTION OF THE DRAWINGS

The following descriptions should not be considered limiting in any way. With reference to the accompanying drawings, like elements are numbered alike.

DETAILED DESCRIPTION

A detailed description of one or more embodiments of the disclosed apparatus and method are presented herein by way of exemplification and not limitation with reference to the Figures.

Figure 1:
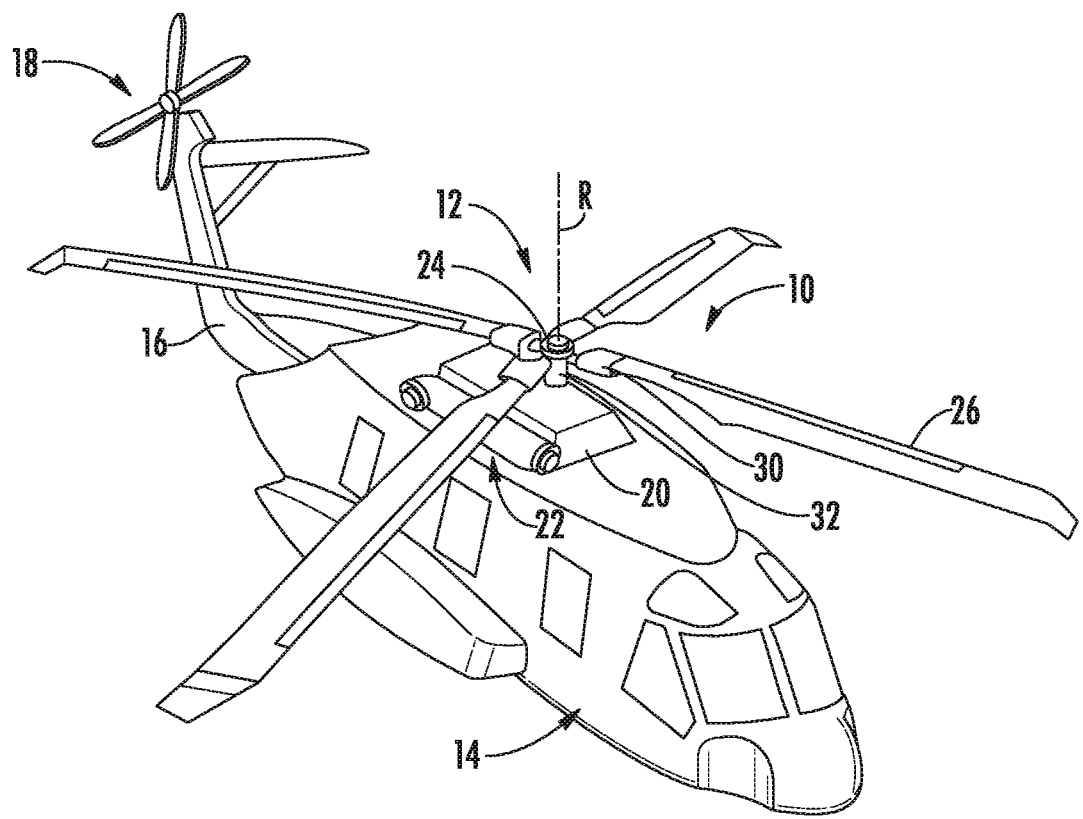
FIG. 1 depicts a rotary wing aircraft including a multi-speed gear box, in accordance with an aspect of an exemplary embodiment.

FIG. 1 depicts vehicle, in the form of a vertical takeoff and landing (VTOL) aircraft 10 including a main rotor system 12 that rotates about a main rotor axis R. Aircraft 10 includes an airframe 14 having an extended tail 16 that supports a tail rotor system 18. Main rotor system 12 is coupled to a multi-speed main rotor gear box 20 that may be driven by one or more controllable systems, such as a prime mover(s) that may take the form of a gas turbine engine (s) one of which is indicated at 22. Main rotor system 12 includes a rotor hub 24 that supports a plurality of rotor blades, one of which is indicated at 26 that are rotated about main rotor axis "R". It should be understood that the vehicle in accordance with exemplary embodiments may take on various forms and is not limited to aircraft.

Each rotor blade 26 includes a hub end portion 30 that is coupled to main rotor hub 24. Main rotor hub 24 is connected to multi-speed main rotor gear box 20 through a main rotor shaft 32. At this point, it should be understood that VTOL aircraft 10 may also be configured as a dual rotor system, a counter-rotating, coaxial rotor system having upper and lower rotor systems, or any other rotor system having an enclosed hub. It is to be further understood that tail rotor system 18 may take on a variety of forms including those providing propulsion. That is, it should be noted that tail rotor system may also take the form of a translational thrust system.

Figure 2:
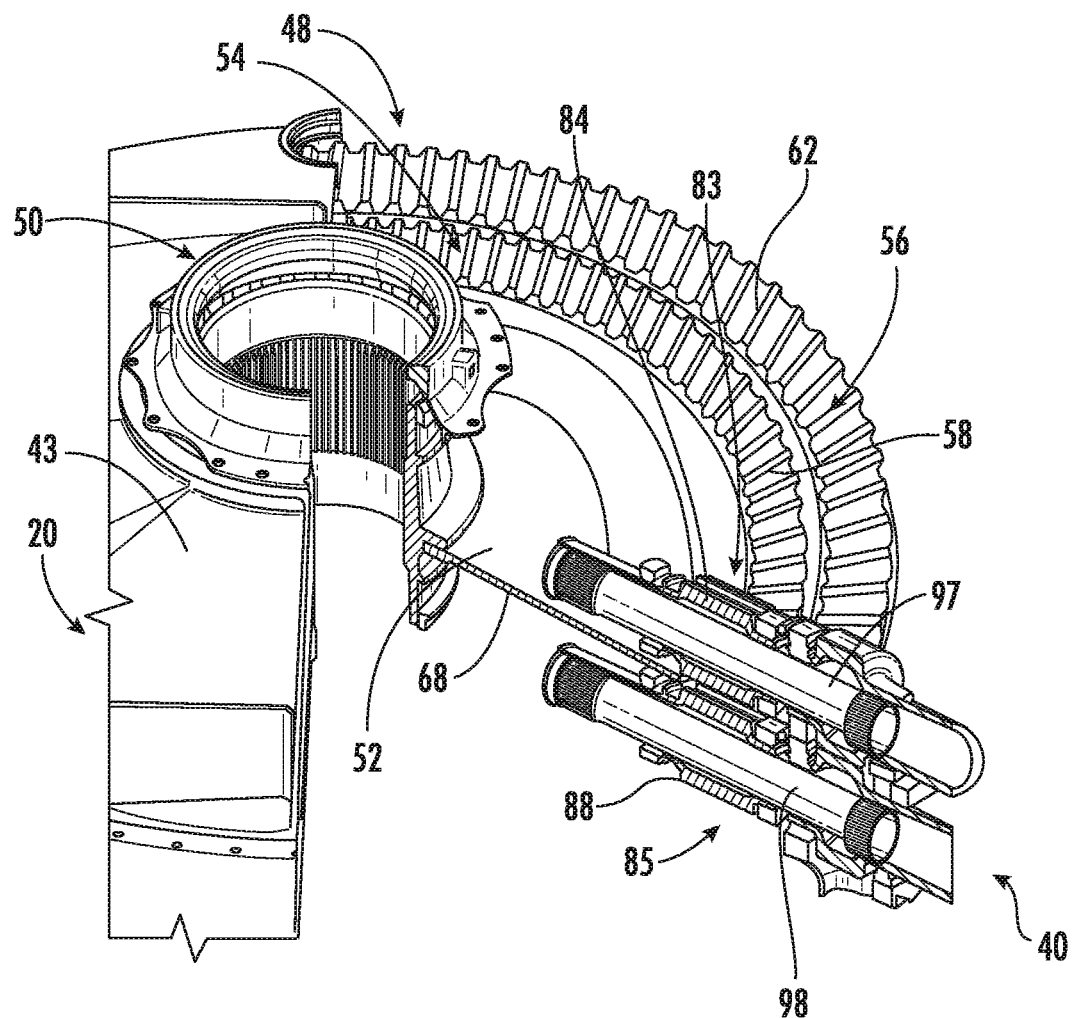
FIG. 2 depicts a partial cross-sectional view of a multi-speed gear system of the multi-speed gear box of FIG. 1, in accordance with an aspect of an exemplary embodiment.
Figure 3:
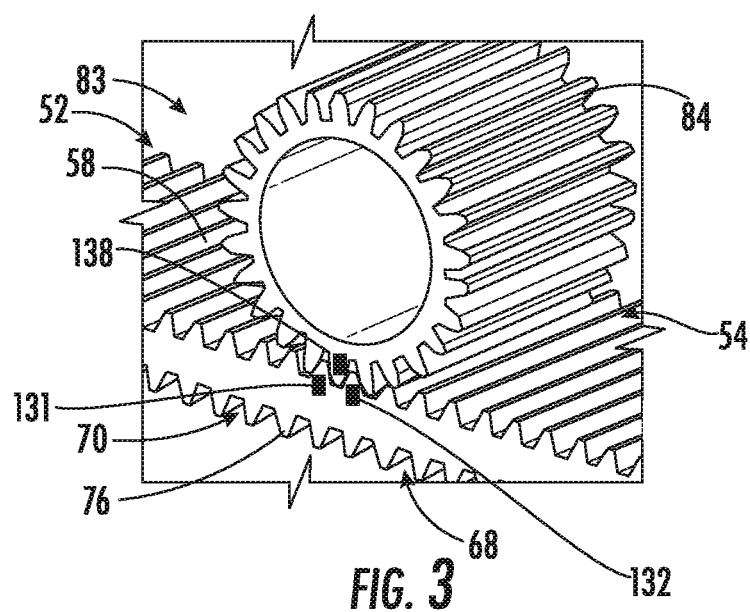
FIG. 3 depicts a pinion gear mating with a face gear of the multi-speed gear system of FIG. 2, in accordance with an aspect of an exemplary embodiment.

Referring to FIGS. 2 and 3, multi-speed main rotor gear box 20 includes a multi-speed main rotor gear system 40 having a housing 43 that encloses a face gear 48 connected to a hub 50 in accordance with an exemplary aspect. Hub 50 is receptive of, for example, main rotor shaft 32 such that the rotation of the hub 50 drives the rotor blades 26. Face gear 48 includes a first surface 52 having an inner gear portion 54 and an outer gear portion 56. Inner gear portion 54 includes a first plurality of gear teeth 58 having a first pitch and outer gear portion 56 includes a second plurality of gear teeth 62 having a second pitch. Face gear 48 also includes a second, opposing surface 68 including an inner gear portion 70 (FIG. 3) and an outer gear portion (not shown). In a manner similar to that discussed above relative to the first surface 52, inner gear portion 70 includes a plurality of gear teeth 76 including the first pitch and the outer gear portion includes a plurality of gear teeth (also not shown) including the second pitch.

In further accordance with an exemplary aspect, multi-speed gear system 40 includes a second gear, shown in the form of a first pinion gear 83 arranged at first surface 52. First pinion gear 83 includes a first plurality of pinion gear teeth 84 having a third gear pitch. The first pitch, second pitch, and third pitch may be substantially similar. Of course, it should be understood that one or more of the first pitch, second pitch and third pitch may be different from one another. As will be detailed more fully below, first pinion gear 83 may transition between inner gear portion 54 and outer gear portion 56. In an effort to provide balancing forces between first surface 52 and second surface 68, in an embodiment, multi-speed gear system 40 may also include a third gear shown in the form of a second pinion gear 85. In an embodiment, second pinion gear 85 is arranged at second surface 68. Second pinion gear 85 includes a second plurality of gear teeth 88 having the third pitch. Second pinion gear 85 may be selectively transitioned between inner gear portion 70 and the outer gear portion on second surface 68.

Figure 4:
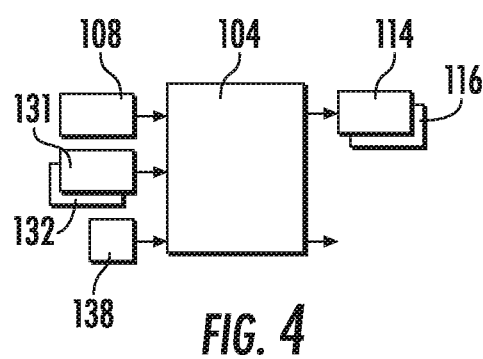
FIG. 4 depicts a block diagram illustrating a controller operatively connected to the multi-speed gear system of FIG. 2, in accordance with an aspect of an exemplary embodiment.

First pinion gear 83 is connected to a first drive gear 97 and second pinion gear 85 is coupled to a second drive gear 98. First and second drive gears 97 and 98 are coupled to one another through a drive member (not separately labeled) that may receive power from gas turbine engine 22. In this manner, first and second drive gears 97 and 98 may be synchronized. First and second pinion gears 83 and 85 are also coupled to a controller 104 (FIG. 4). Controller 104 receives commands from an input device 108, which may take the form of a throttle, to shift pinion gear 83 between inner gear portion 54 and outer gear portion 56 on first surface 52 and pinion gear 85 between inner gear portion 70 and the outer gear portion on second surface 68. In this way, when engaged with the inner gear portion 54, 70, the rotor blades 26 turn at a higher speed consistent with takeoff, landing and hover, and when engaged with the outer gear portion 56, the rotor blades 26 turn at a lower speed consistent with cruise. While not required, the lower speed may be 50% of the higher speed according to aspects of the invention. At this point, it should be understood that controller 104 could be an independent device including a processor, memory on which is stored operating instructions and the like, or part of another system on board aircraft 10.

In accordance with an exemplary aspect, first pinion gear 83 is connected to a first linear actuator 114 and second pinion gear 85 is connected to a second linear actuator 116. First and second liner actuators 114 and 116 are connected to controller 104. With this arrangement, controller 104 can shift pinion gears 83 and 85 radially inwardly and radially outwardly relative to first and second surfaces 52 and 68. For example, outer gear portion 56 on first surface 52 and the outer gear portion on second surface 68 may be engaged by corresponding ones of pinion gears 83 and 85 during cruising speeds. Each inner gear portion 54, 70 may be engaged by corresponding ones of pinion gears 83 and 85 during takeoff, landing and hover.

In accordance with an exemplary aspect, inner gear portion 54 may include sensors 131 and 132 embedded in adjacent ones of gear teeth 58. First pinion gear 83 also include a sensor 138 embedded in one of gear teeth 84. Sensors 131, 132, and 138 are coupled to controller 104 and may take on various forms including wireless sensors and/or other sensing systems that may detect and report a position of one gear relative to another. In an embodiment, controller 104 may receive signals from sensors 131 and 133 to detect a position of sensor 138. In this manner, controller 104 may operate linear actuator 114 at a selected timing to ensure a proper meshing of gear teeth 84 with select ones of gear teeth 62. At this point, it should be understood that additional sensors may be arranged in first pinion gear 83, second surface 68 and second pinion gear 85. At this point, it should be understood that additional sensors may be arranged on outer gear portion 56 on first surface 52 and the outer gear portion on second surface 68.

With this arrangement, inner gear portion 54 would allow the face gear to run at full speed while the outer gear portion 56 would allow the face gear to operate at, for example, half speed. During take-off, landing, and hover, rotor craft 10 would operate at full speed. As such first and second pinion gears 83 and 85 would be shifted to engage with inner gear portion 54 on first surface 52 and inner gear portion 70 on second surface 68. During cruise, the first and second pinion gears 83 and 85 may be shifted radially outwardly into engagement with outer gear portions 56 on first surface 52 and the outer gear portion on second surface 68. During a gear change (inner to outer and vice versa), engine speed could be adjusted to accommodate any speed changes. In addition, the use of sensors in the face gear and one or more of the pinion gears, changing gears may be accomplished while the face gear is rotating. Thus, gears may be changed without the need for clutches.

The terminology used herein is for the purpose of describing particular embodiments only and is not intended to be limiting of the present disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

The terms "about" and "substantially" are intended to include the degree of error associated with measurement of the particular quantity based upon the equipment available at the time of filing the application. For example, "about" and/or "substantially" can include a range of ±8% or 5%, or 2% of a given value.

While the present disclosure has been described with reference to an exemplary embodiment or embodiments, it will be understood by those skilled in the art that various changes may be made and equivalents may be substituted for elements thereof without departing from the scope of the present disclosure. In addition, many modifications may be made to adapt a particular situation or material to the teachings of the present disclosure without departing from the essential scope thereof. Therefore, it is intended that the present disclosure not be limited to the particular embodiment disclosed as the best mode contemplated for carrying out this present disclosure, but that the present disclosure will include all embodiments falling within the scope of the claims.

What is claimed is:

1. A gear system for a rotary wing aircraft comprising:
    a first gear including an inner gear portion having a first pitch and an outer gear portion having a second pitch that is distinct from the first pitch;
    a second gear including a third pitch which is driven at a driving rotational speed;
    an actuator coupled to the second gear while the second gear is driven at the driving rotational speed, the actuator configured to shift the second gear along a radius of the first gear to selectively engage with one of the inner gear portion and the outer gear portion to drive the first gear at a first rotational speed, and to selectively engage with the other of the inner gear portion and the outer gear portion to drive the first gear at a second rotational speed other than the first rotational speed;
    a controller operable to selectively control the actuator to shift the second gear between the inner gear portion and the outer gear portion
    a first sensor mounted to the first gear and operably connected to the controller; and
    a second sensor mounted to the second gear and operably connected to the controller, the controller being operable to determine a rotational position of the second gear relative to the first gear.

2. The gear system according to claim 1, wherein the outer gear portion includes a first plurality of gear teeth, the inner gear portion includes a second plurality of gear teeth, and the second gear includes a third plurality of gear teeth, wherein the first sensor is arranged in one of the first and second pluralities of gear teeth and the second sensor is arranged in one of the third plurality of gear teeth.

3. The gear system according to claim 2, wherein the first sensor includes a first sensor element arranged in one of the first and second pluralities of gear teeth and a second sensor element arranged in another one of the first and second pluralities of gear teeth.

4. The gear system according to claim 2, wherein the first sensor includes a first sensor element arranged in one of the first plurality of gear teeth and a second sensor element arranged in an adjacent one of the first plurality of gear teeth.

5. The gear system according to claim 1, wherein the first gear includes a first surface supporting the inner gear portion and the outer gear portion and a second, opposing surface supporting another inner gear portion and another outer gear portion.

6. The gear system according to claim 5, wherein the second gear includes a first pinion gear selectively engaged with the inner gear portion and the outer gear portion and a second pinion gear selectively engaged with the another inner gear portion and the another outer gear portion.

7. A rotary wing aircraft comprising:
    a main rotor assembly including a main rotor shaft, a rotor hub connected to the main rotor shaft, and a plurality of rotor blades connected to the rotor hub;
    at least one prime mover connected to the main rotor assembly; and
    a gear system mechanically connecting the at least one prime mover and the main rotor assembly, the gear system comprising:
        a first gear including an inner gear portion having a first pitch and an outer gear portion having a second pitch that is distinct from the first pitch;

a second gear including a third pitch which is driven at a driving rotational speed;

an actuator coupled to the second gear while driven at the driving rotational speed, the actuator configured to shift the second gear along a radius of the first gear to selectively engage with one of the inner gear portion and the outer gear portion to drive the first gear at a first rotational speed, and to selectively engage with the other of the inner gear portion and the outer gear portion to drive the first gear at a second rotational speed other than the first rotational speed; and a controller operable to selectively control the actuator to shift the second gear between the inner gear portion and the outer gear portion.

8. The rotary wing aircraft of claim 7, wherein the gear system further comprises:

a first sensor mounted to the first gear and operably connected to the controller; and a second sensor mounted to the second gear and operably connected to the controller, the controller being operable to determine a rotational position of the second gear relative to the first gear.

9. The rotary wing aircraft of claim 8, wherein the outer gear portion includes a first plurality of gear teeth, the inner gear portion includes a second plurality of gear teeth, and the second gear includes a third plurality of gear teeth, wherein the first sensor is arranged in one of the first and second pluralities of gear teeth and the second sensor is arranged in one of the third plurality of gear teeth.

10. The rotary wing aircraft of claim 9, wherein the first sensor includes a first sensor element arranged in one of the first and second pluralities of gear teeth and a second sensor element arranged in another one of the first and second pluralities of gear teeth.

11. The rotary wing aircraft of claim 9, wherein the first sensor includes a first sensor element arranged in one of the first plurality of gear teeth and a second sensor element is arranged in an adjacent one of the first plurality of gear teeth.

12. The rotary wing aircraft of claim 7, wherein the first gear includes a first surface supporting the inner gear portion and the outer gear portion and a second, opposing surface supporting another inner gear portion and another outer gear portion.

13. The rotary wing aircraft of claim 12, wherein the second gear includes a first pinion gear selectively engaged with the inner gear portion and the outer gear portion and the gear system further comprising a second pinion gear selectively engaged with the another inner gear portion and the another outer gear portion.

14. The rotary wing aircraft of claim 13, wherein the prime mover includes a first engine operatively connected to the first pinion gear and operatively connected to the second pinion gear.

* * * * *